United States Patent

Okanda et al.

[11] Patent Number: 6,124,693
[45] Date of Patent: Sep. 26, 2000

[54] ROBOT CONTROLLER

[75] Inventors: Koichi Okanda; Takeaki Aramaki, both of Yamanashi, Japan

[73] Assignee: Fanuc Limited, Yamanashi, Japan

[21] Appl. No.: 09/350,276

[22] Filed: Jul. 9, 1999

[30] Foreign Application Priority Data

Jul. 9, 1998 [JP] Japan ................................. 10-208532

[51] Int. Cl.[7] ....................................................... B25J 9/18
[52] U.S. Cl. ................................ 318/568.11; 318/568.12; 318/568.13; 318/568.19; 318/564; 901/30; 901/42; 901/41
[58] Field of Search ........................... 318/568.11, 568.12, 318/568.13, 568.19, 569; 700/182; 901/30, 41, 42

[56] References Cited

U.S. PATENT DOCUMENTS

| | | | |
|---|---|---|---|
| 6,021,361 | 2/2000 | Taninaga et al. | 901/42 |
| 6,023,044 | 2/2000 | Kosaka et al. | 90/42 |
| 6,040,554 | 3/2000 | Terada et al. | 901/42 |

FOREIGN PATENT DOCUMENTS

| | | |
|---|---|---|
| 62-214404 | 9/1987 | Japan . |
| 03003687 | 1/1991 | Japan . |
| 05185387 | 7/1993 | Japan . |
| 06008169 | 1/1994 | Japan . |
| 06328385 | 11/1994 | Japan . |
| 09016260 | 1/1997 | Japan . |

*Primary Examiner*—Karen Masih
*Attorney, Agent, or Firm*—Staas & Halsey, LLP

[57] ABSTRACT

Axes used for posture alignment are selected from the axes of a work coordinate system W and a tool coordinate system T, and an angle of intersection between those selected axes are set. A robot is then driven so that the selected axes intersect with each other by the set angle of intersection in response to a posture alignment instruction, causing the tool to assume a target posture with respect to a workpiece. Further, angles for rotating the work coordinate system about each axis thereof are set, then the robot is automatically moved so that a coordinate system produced by rotating the work coordinate system by the set angle in response to a posture alignment instruction. Further, the tool coordinate system set at a movable part of a tool is automatically reset according to an amount of movement every time the movable part of the tool move, and the robot is manually fed based on the tool coordinate system thus reset.

8 Claims, 13 Drawing Sheets

ROBOT CONTROLLER

BACKGROUND OF THE INVENTION

1. Field of the Invention

The present invention relates to a robot controller for making teaching work easier.

2. Description of the Related Art

One method of teaching a robot is direct teaching where a robot is manually operated so as to be taught each teaching point. In this method, an operator selectively teaches the teaching points while monitoring the positional relationship of tools attached to the wrist of the robot and the workpiece.

However, when, for example, a position at the lower part of the body of a vehicle is to be taught as a position for spot welding, it is probable that this position to be taught cannot be seen. Conventionally, with teaching of places where the positional relationship between the robot tools and the workpiece is difficult to discern, teaching of such teaching points has relied upon the intuition of the operator. When teaching a contact position of a tool and a workpiece, the contact conditions are discerned by the operator. When a location is difficult to see, methods as described above where teaching is carried out relying upon the intuition of the operator or where the operate teaches while looking with a lamp to be aware of contact between tools and a workpiece are also put into practice.

In cases where a position is taught where a robot (tool) should be moved in a fixed direction by a fixed amount from a current position, conventionally a method has been adopted where a manual operation is carried out while the operator confirms the current position of the robot (tool), the robot (tool) is moved up to the teaching position, the desired distance of operation is added to the current position and the teaching position is directly obtained.

There are also cases where it is preferable to change the position or posture of a tool by performing a manual feed operation to the position where the tool is to be moved, taking the tool center point as a reference. In this case, conventionally, the tool coordinate system is reset every time the position where the tool center point is set is moved. Further, when a teaching point is taught where a tool is brought into contact with or brought close to the workpiece in a fixed posture, the operator operates the tool until the desired posture is obtained using a manual feeding.

However, relying on the intuition of the operator for teaching positions that are difficult to see invites inaccuracy in the teaching positions and teaching work therefore becomes difficult. Further, in the case of teaching a position of contact of the workpiece and the tool, variations in teaching position occur and reliable teaching work is difficult when teaching relies upon the intuition of the operator or when the operator carries out teaching while monitoring the contact position of a workpiece and a tool using a lamp.

In the case of operations of a fixed amount in a fixed direction from a current position, with methods where a teaching position is obtained from manual feeding by the operator or by adding to a current position a distance to be moved, variations in the teaching position occur and teaching work becomes complex. Further, resetting a tool coordinate system every time the tool center point moves when changing the tool posture taking the tool center point as a reference, or obtaining a posture of the tool through manual operation when bringing a tool into contact with or close to a workpiece in a fixed posture also makes teaching work complicated.

OBJECTS AND SUMMARY OF THE INVENTION

It is the object of the present invention to provide a robot controller that can assist a teaching operation and where teaching is straightforward.

The robot controller according to the present invention automatically obtains a target position, upon inputting a manual posture alignment instruction, such an axis selectively set for a set tool coordinate system and that an axis selectively set for a work coordinate system intersect with each other by a set angle or make parallel with each other, based upon set data on the intersecting angle or being parallel of those axes. Then the robot is manually controlled to move to the target position. These procedures make teaching work easy.

Teaching work is also made easier by automatically obtaining a target position where a relationship set for the tool coordinate system and the work coordinate system is fulfilled using a manual alignment instruction and by manually feeding the robot to the target position.

When a tool having moving parts is attached to a wrist at the end of a robot arm and a reference tool coordinate system is set for the moving parts, the reference tool coordinate system is transformed based on the amount of movement of the moving parts of the tool and the tool coordinate system is lined up with the movement of the moving parts of the tool. This also makes teaching work easier.

When manual feeding suspension conditions are preset at the robot controller and a monitoring means detects that the suspension conditions have been fulfilled during the manual feeding, the manual feeding is automatically suspended. This also makes teaching work easier.

The foregoing and other objects and features of the invention will become apparent from the following description of the preferred embodiments of the invention with reference to the accompanying drawings, in which.

Figure 5:
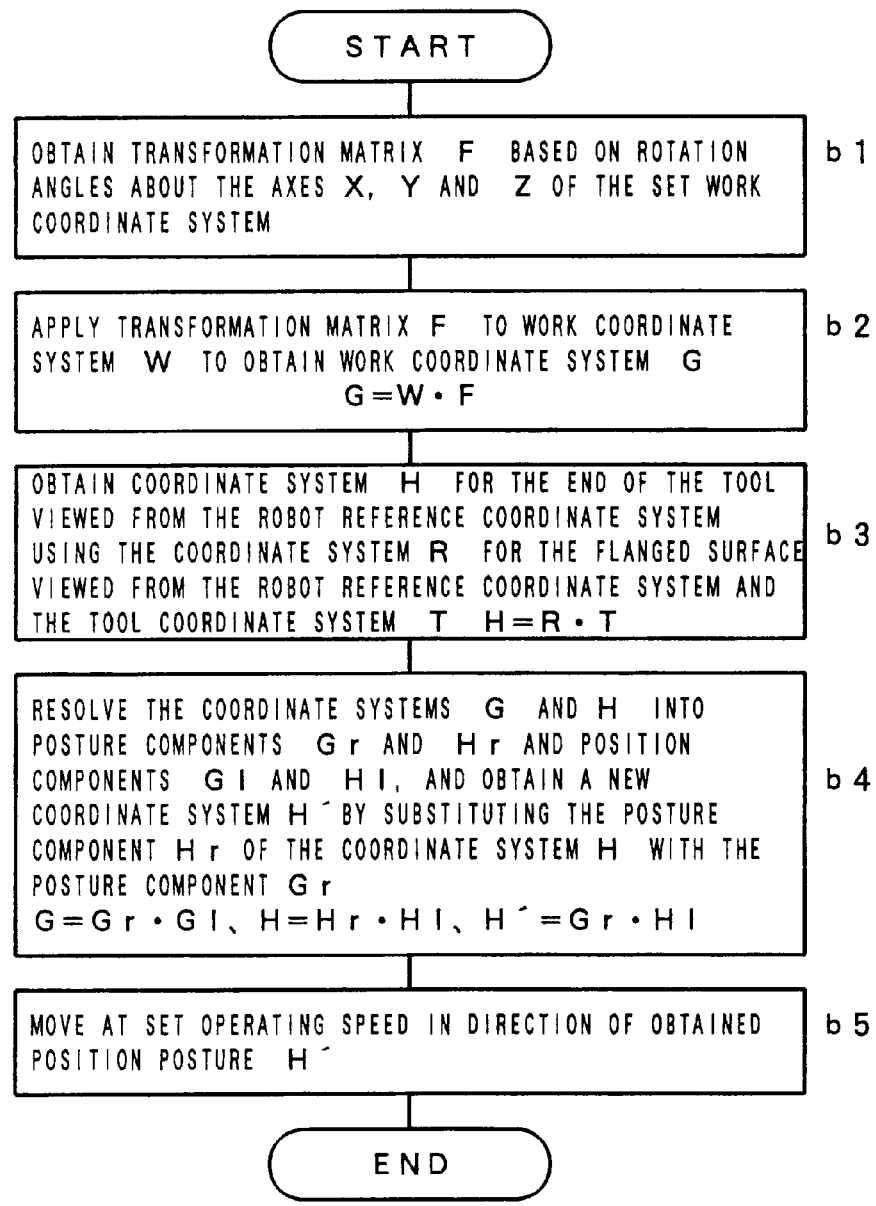
Figure 6:
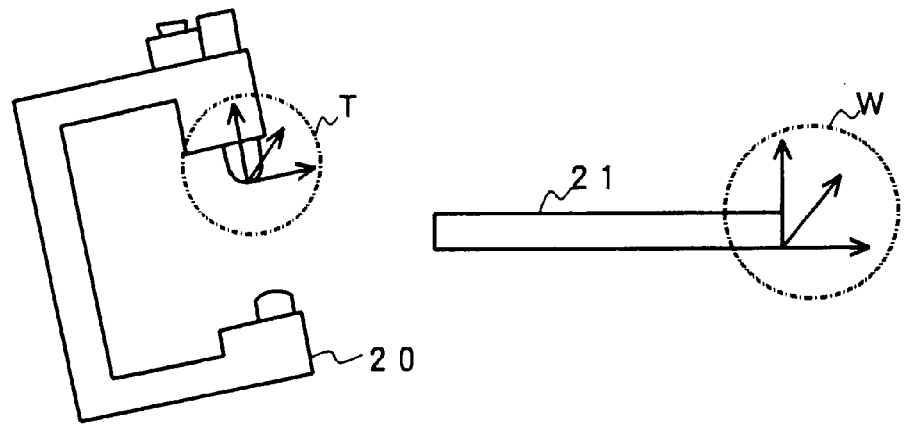
Figure 6:
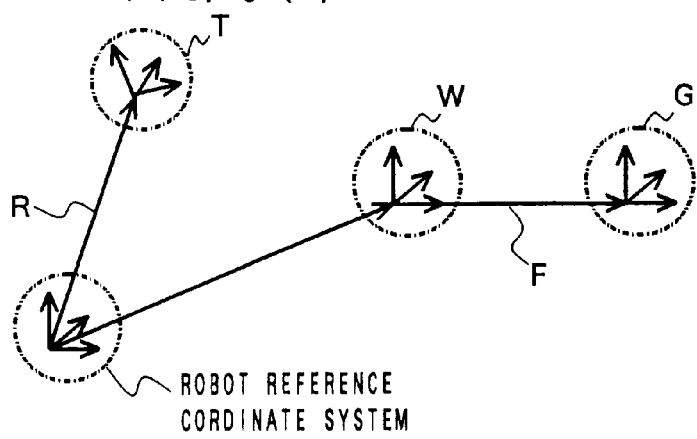
Figure 6:
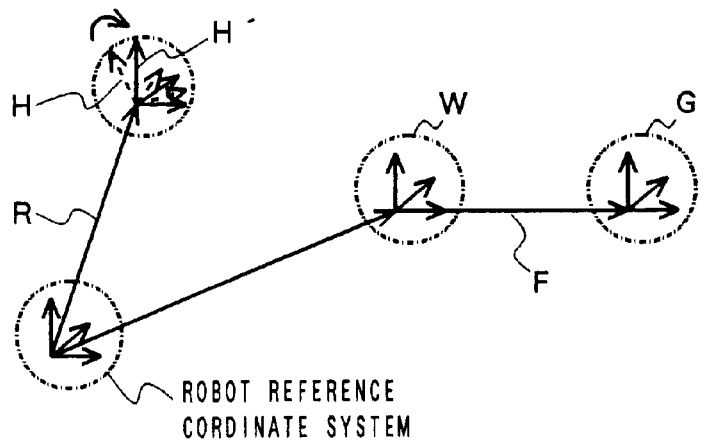
Figure 7:
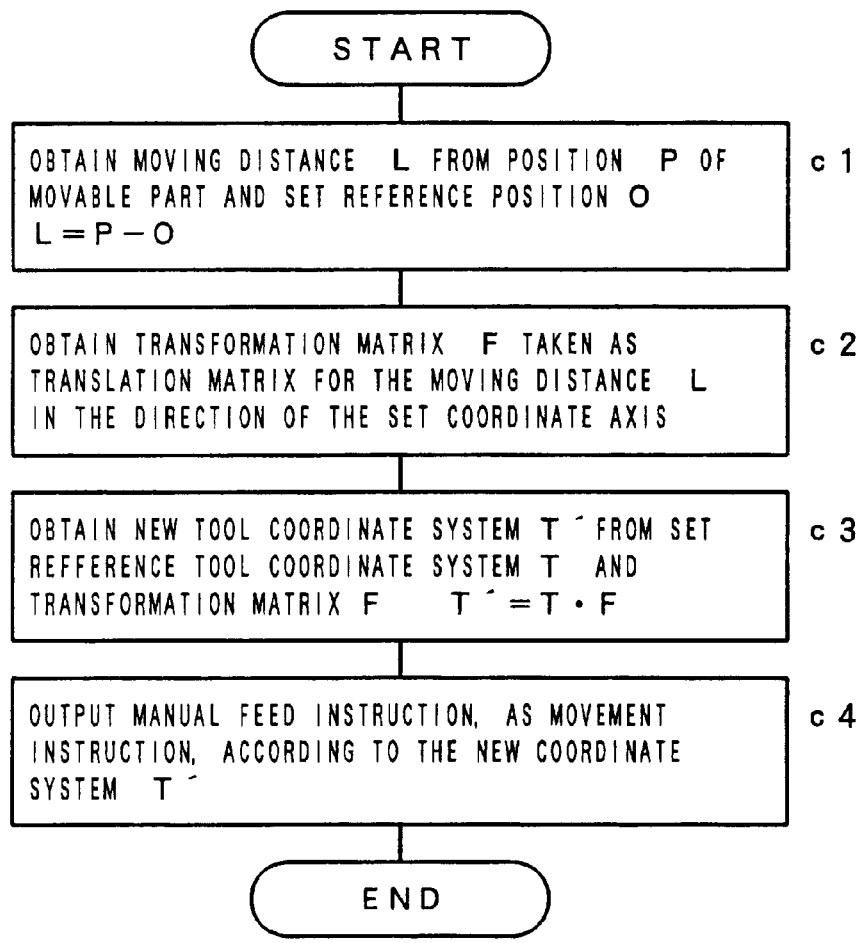
Figure 8:
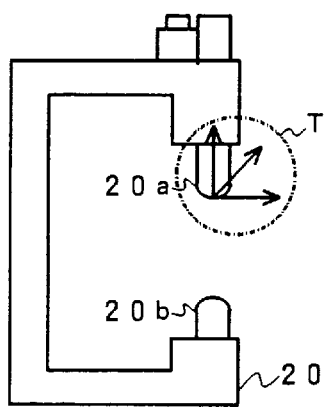
Figure 8:
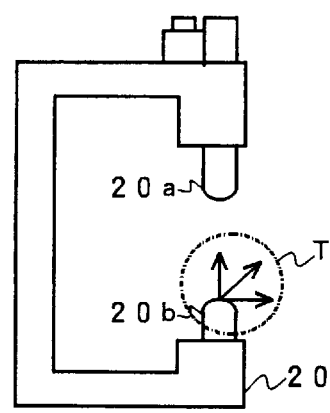
Figure 8:
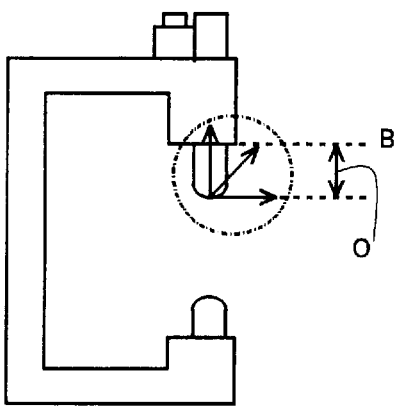
Figure 8:
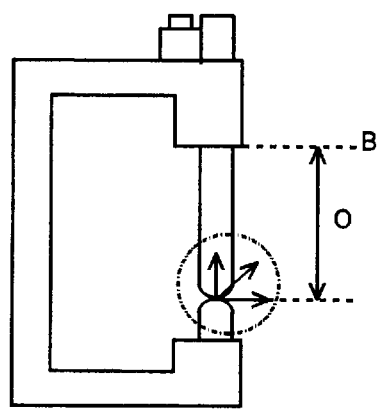
Figure 8:
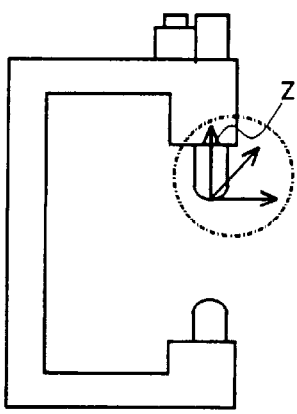
Figure 8:
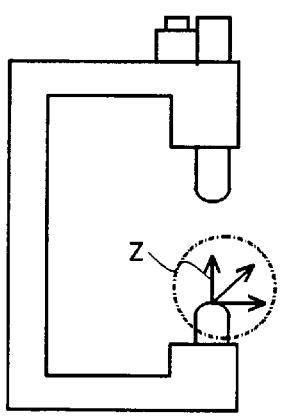
Figure 9:
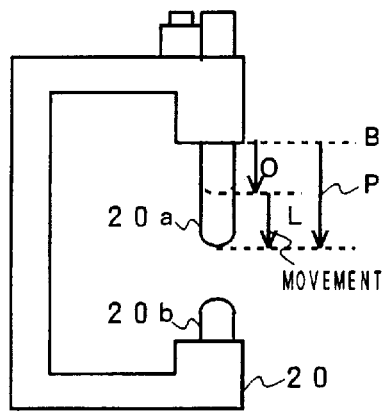
Figure 9:
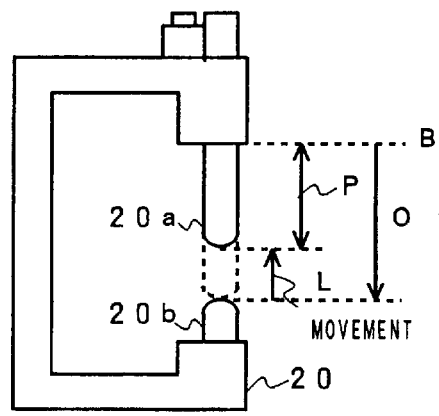
Figure 9:
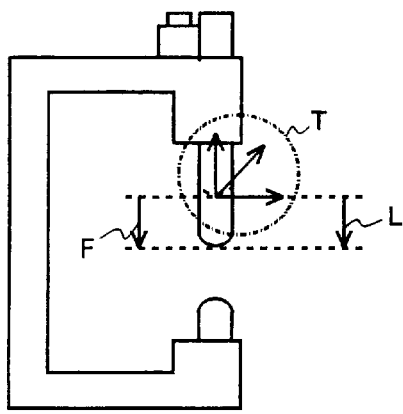
Figure 9:
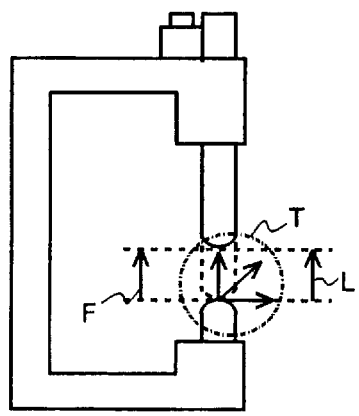
Figure 9:
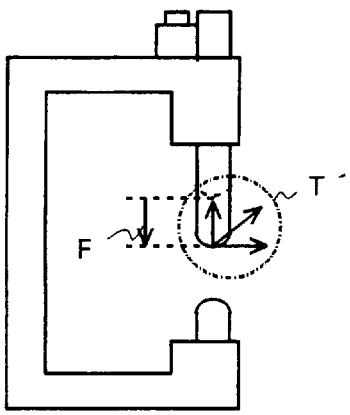
Figure 9:
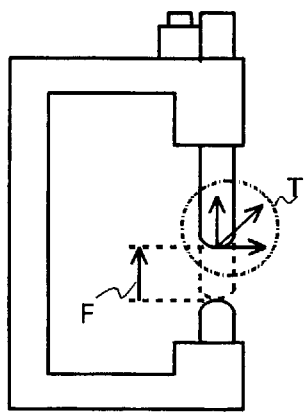
Figure 10:
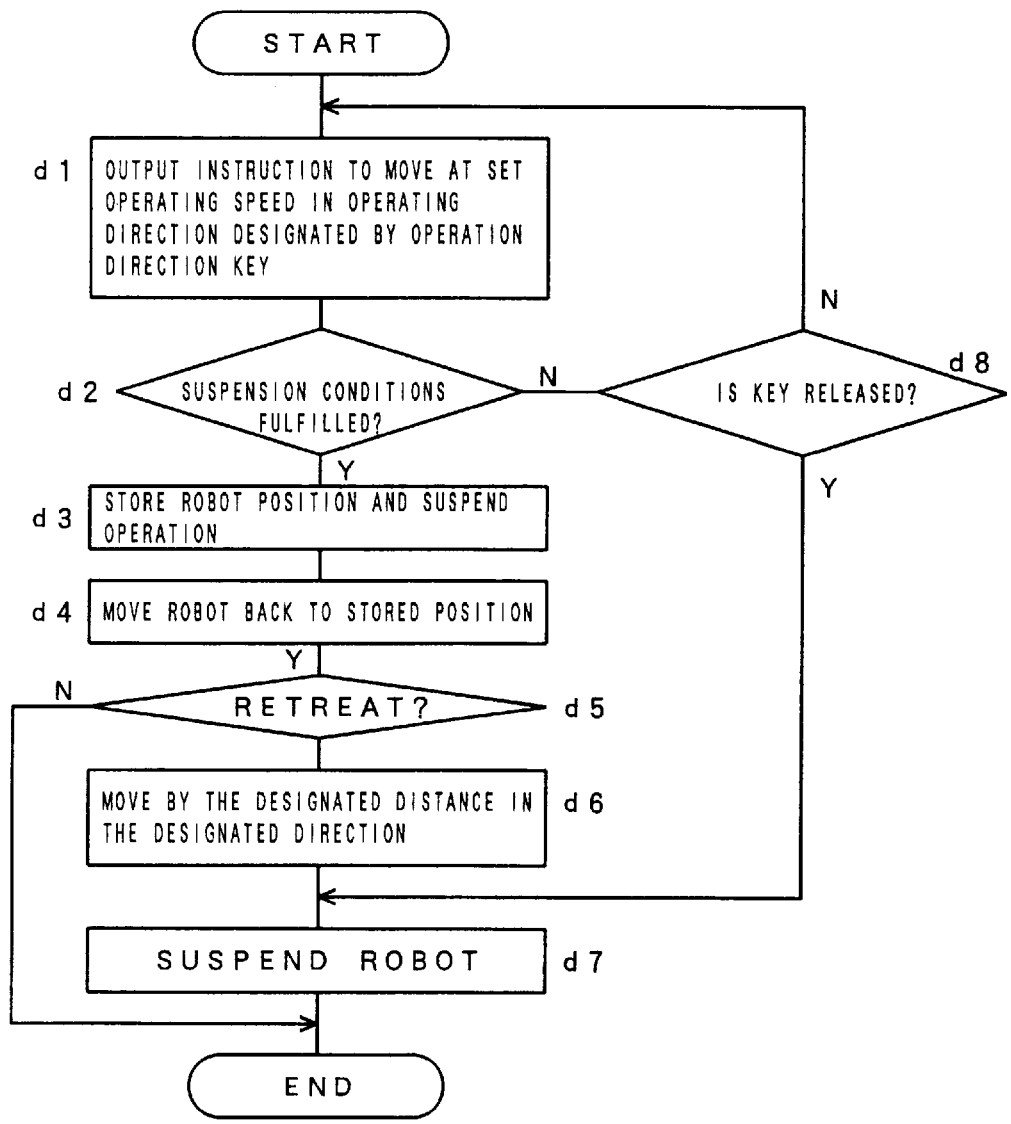
Figure 11A:
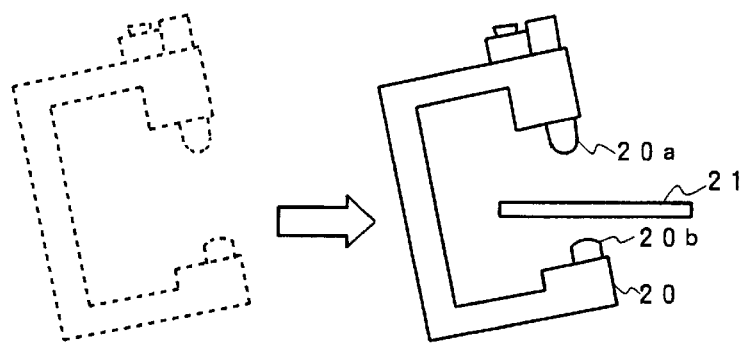
Figure 11B:
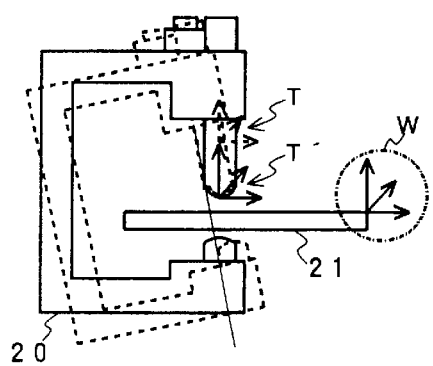
Figure 11C:
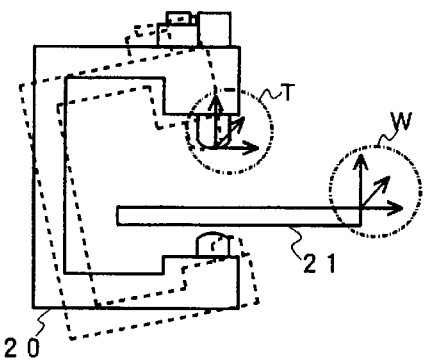
Figure 11D:
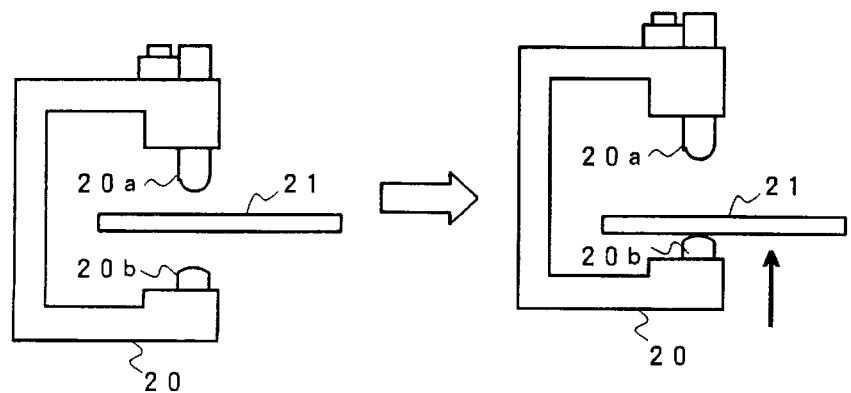
Figure 12:
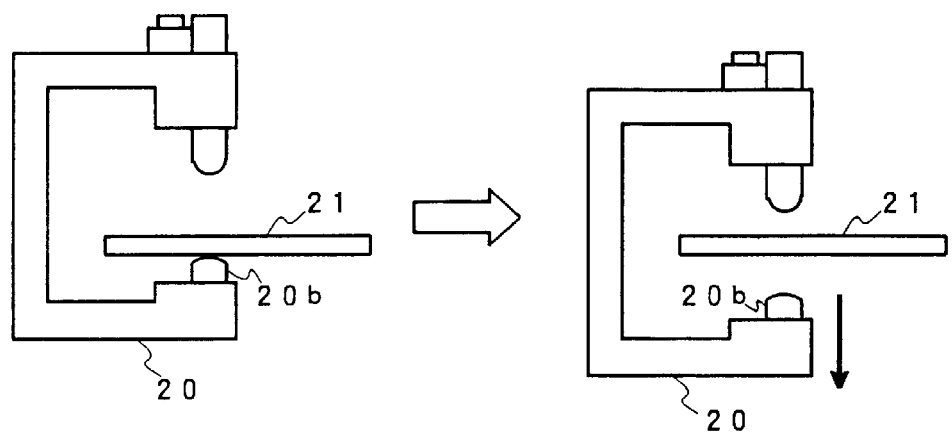

FIGS. 4(a)–4(g) are views illustrating actions done by the first embodiment;

FIG. 5 is a flowchart which shows a posture alignment done by a second embodiment of the present invention;

FIGS. 6(a)–6(c) are views illustrating the actions done by the second embodiment;

FIG. 7 is a flowchart which shows a tool coordinate system resetting process performed by a third embodiment of the present invention;

FIGS. 8(a)–8(c') and FIGS. 9(a)–9(c') are views illustrating actions done by the third embodiment;

FIG. 10 is a flowchart which shows a process for automatically suspending a manual feeding performed by a fourth embodiment of the present invention;

FIGS. 11(a)–11(d) are views illustrating the application of each embodiment of the present invention to a servo gun for carrying out spot welding;

FIG. 12 is a view illustrating an operation for making retreat after a tool makes contact with a workpiece when each embodiment of the present invention is applied to an air gun for carrying out spot welding; and FIGS. 13(a)–13(c) are views illustrating the operation when each embodiment of the present invention is applied to a hand with moving parts driven by a servo system.

DETAILED DESCRIPTION OF THE PREFERRED EMBODIMENTS

Figure 1:
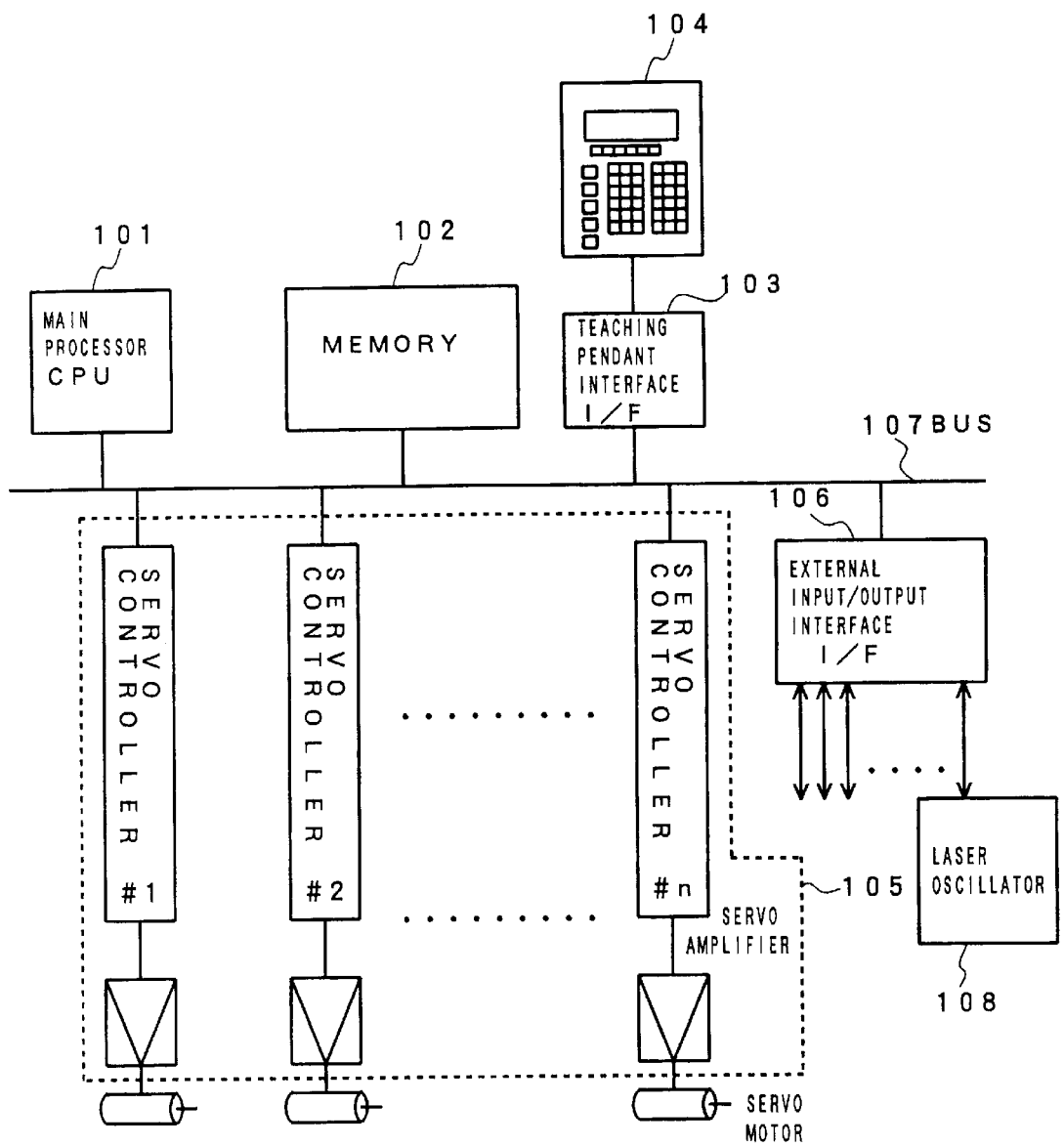
FIG. 1 is a block diagram of the essential parts of a robot controller according to the present invention.

FIG. 1 is a block diagram of the essential parts of a robot controller of the first embodiment of the present invention, having the same configuration as a prior art robot controller. A main processor (hereinafter referred to simply as "processor") 101, a memory 102 comprising RAM, ROM and non-volatile memory (EEPROM etc.), a teaching pendant interface 103, an input/output interface 106 for use with external devices and a servo control unit 105 are connected to a bus 107. A teaching pendant 104 is connected to the teaching pendant interface 103.

A system program supporting the basic functions of the robot and the robot controller is stored in the ROM of the memory 102. Programs for operating the robot to be taught in response to applications and related set data are stored in the non-volatile memory of the memory 102. The RAM of the memory 102 is used as a storage region for temporarily storing data occurring in various arithmetic processing carried out by the processor 101.

The servo control unit 105 is equipped with servo controllers #1, #2, ..., #n (where n is a number given by adding a number of movable axes of the tool to the total number of axes of the robot), receives movement instructions for controlling the robot resulting from arithmetic processing (orbit plan production and interpolation and inverse transformations etc. based on this orbit plan production), and controls servo motors comprising actuators for each of the axial mechanisms of the robot via servo amplifiers.

Sensors provided at the robot and sensors and actuators for peripheral devices are connected to external input/output circuits of an input/output interface 106, with sensors for detecting contact between tools and the workpiece being connected in particular in the case of the present invention.

The configuration for the robot controller described above does not differ from a prior art robot controller. The present invention, however, differs from the prior art in that a posture alignment key is provided at the teaching pendant 104 and in that control or the like of the posture and position of a tool is executed automatically in order to provide teaching assistance.

Figure 2:
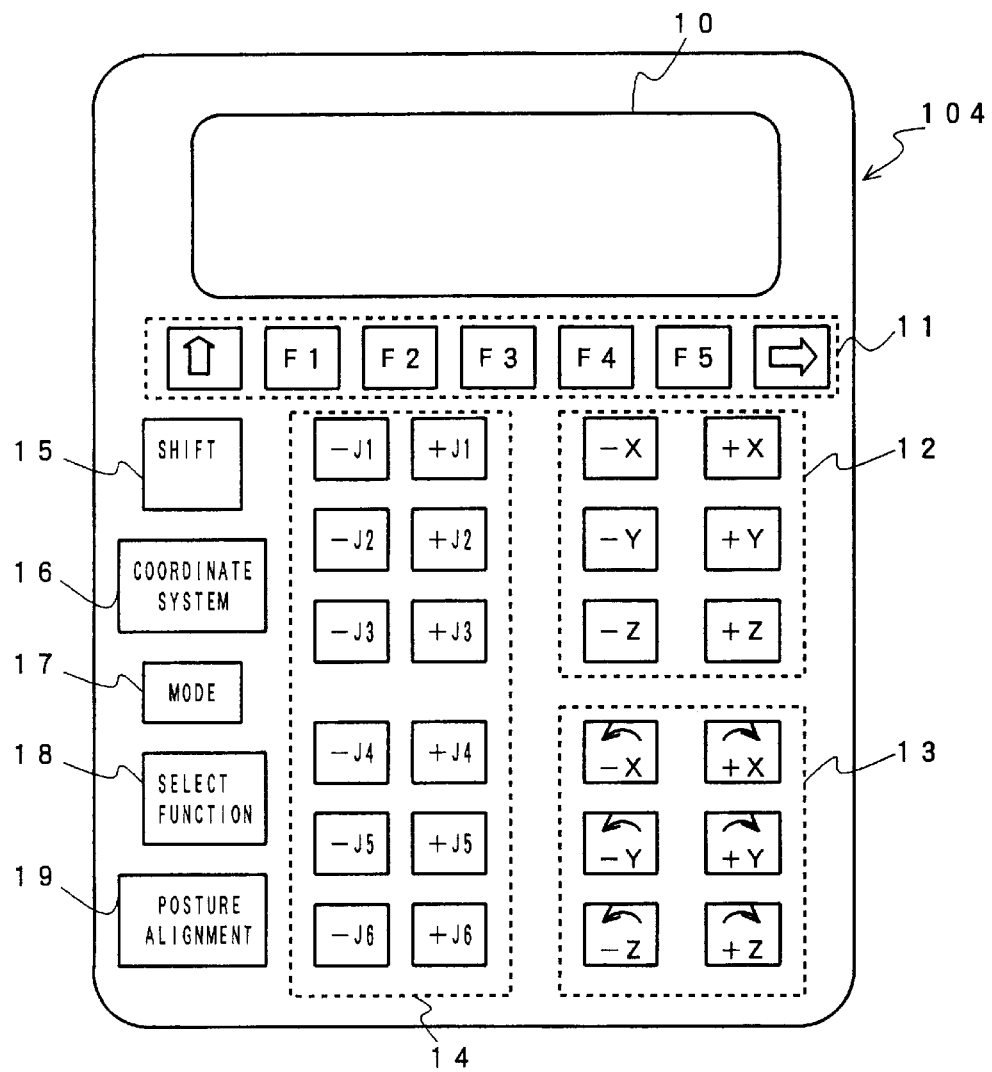
FIG. 2 is a view illustrating the teaching pendant of the robot controller of FIG. 1.

FIG. 2 is a view illustrating an example of a teaching pendant 104 according to the present invention. This teaching pendant 104 differs from a prior art teaching pendant in that a posture alignment key 19 is provided and a mode for teaching assistance (to be described later) can be selected using a soft key 11, with other aspect being the same as for the prior art.

FIG. 2 shows just the portion relating to the present invention, with other portions being omitted, i.e. as in the related art. The teaching pendant 104 of FIG.2 has a display 10 comprising an LCD etc., the soft key 11 for selecting a mode for teaching assistance according to the present invention, a liner movement key 12 for giving instructions to move in + and − directions along axes X, Y and Z of an orthogonal coordinate system selected from coordinate systems (a robot reference coordinate system, a work coordinate system set relative from the reference coordinate system, and a tool coordinate system) selected by a key 16 for selecting a coordinate system, rotation operation keys 13 for giving instructions to rotate in + and − directions about the axes X, Y and Z, and axis operation keys 14 for instructing operations of the robot in + and − directions of each of the joint axes J1 to J6. The teaching pendant 104 shown in FIG. 2 is for 6-axis robot.

Further, the teaching pendant 104 is, as in the prior art, also equipped with a shift key 15, to be pushed together with each of the operation keys 12, 13 and 14, for inputting related instructions, a key 16 for selecting a coordinate system, a mode key 17 for switching between teaching mode and playback mode, and a function selection key 18 for selecting setting display screens for the various coordinate system settings and parameter settings etc. to enable settings to be made.

In reality, the teaching pendant 104 is also provided with keys such as various instruction keys which a prior art teaching pendant would have, in addition to those described above, but FIG. 2 only shows key portions directly relating to the present invention.

An operator carries out, through manual operation using the teaching pendant 104, playing back of a taught operation program, jog-feeding and the like, in addition to teaching of a robot operation programs, modification and registration of the program and setting of various parameters, in the same manner as in the prior art. The display can also be used to give instructions to the operator, display input data and display simulation results.

[First Embodiment]

The first embodiment automatically alters tool posture in such a manner that the relationship between a tool attached to a wrist at the end of an robot arm and the workpiece is the desired relationship.

Specifically, the first embodiment automatically alters tool posture in such a manner that one axis is selected from each of a work coordinate system W set for the workpiece relative to the robot reference coordinate system and a tool coordinate system T set with respect to the tool and a relationship (angle of intersection) set for these axes is attained. As described later in FIG. 11(c), this is applicable to cases of setting the posture of a spot welding gun in such a manner that the tip of the spot welding gun (tool) and the surface of the position of a workpiece to be welded become perpendicular with respect to each other.

Figure 3:
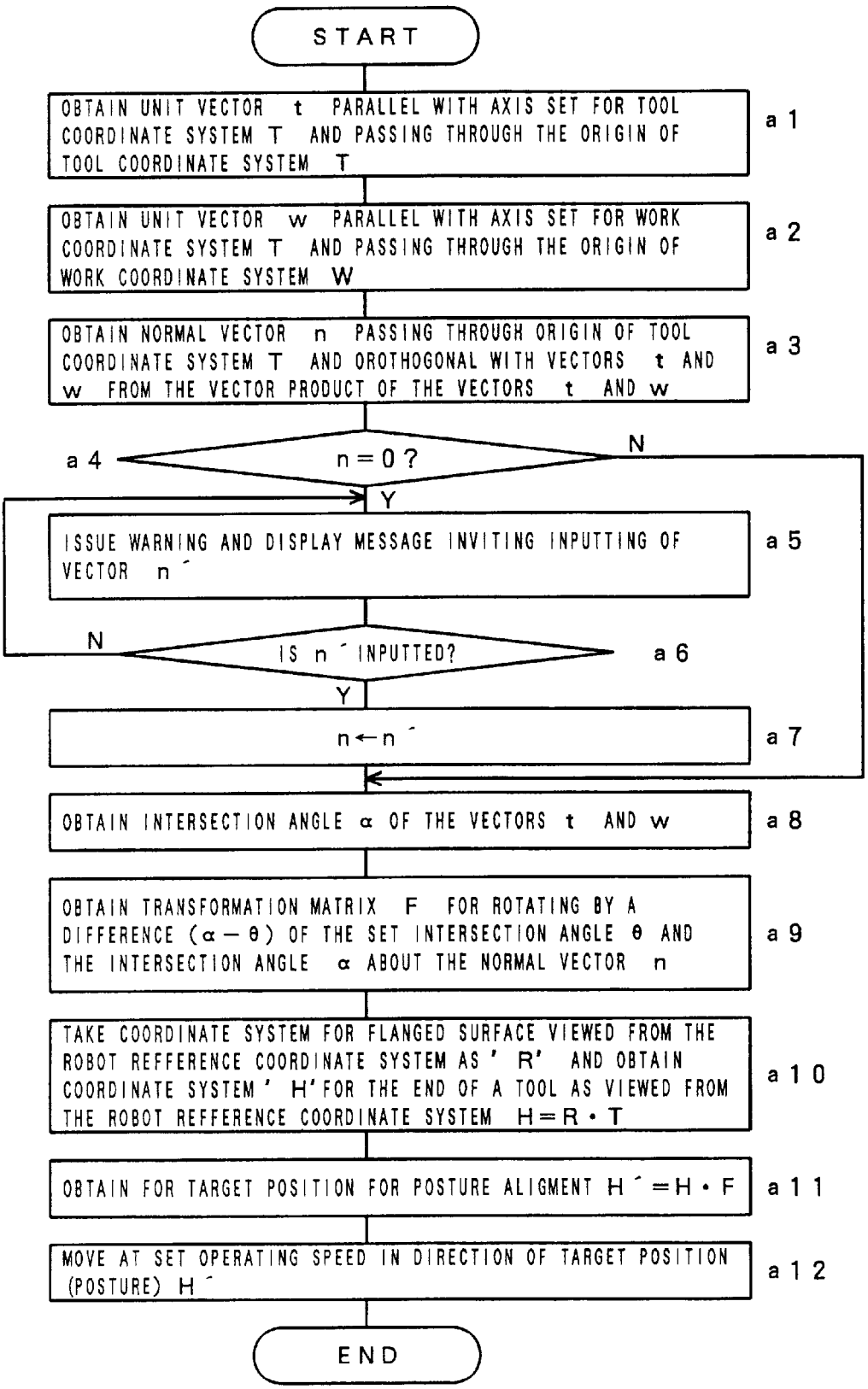
FIG. 3 is a flowchart which shows a posture alignment performed by the first embodiment of the present invention.

The operation of this first embodiment is described referring to FIG. 3 showing processing of the main processor 101 of the robot controller and FIGS. 4(a) to 4(g) illustrating operation according to the embodiment. FIGS. 4(a) to FIG. 4(g) show an example employing a spot welding gun as a tool.

Figure 4:
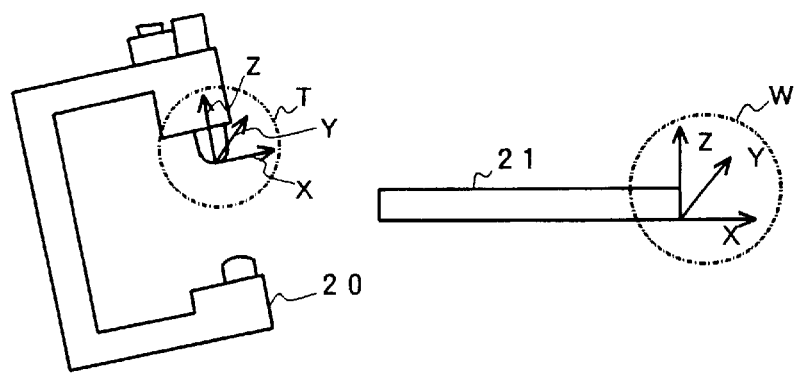
Figure 4:
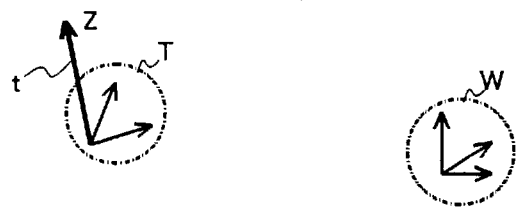
Figure 4:
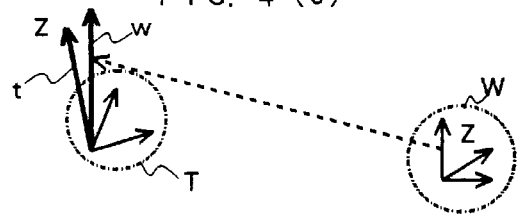
Figure 4:
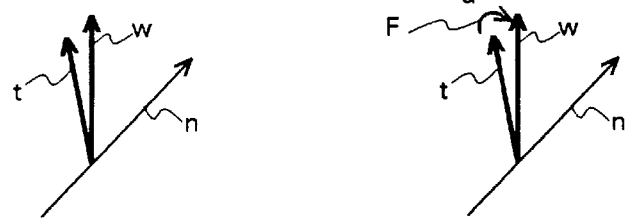
Figure 4:
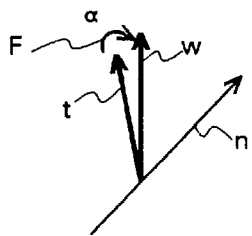
Figure 4:
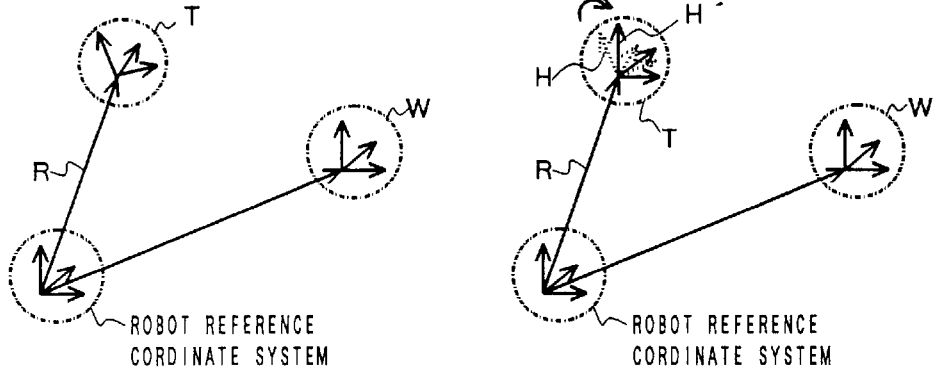

First, the function selection key 18 is operated in advance, and, as shown in FIG. 4(a), a tool coordinate system T and a work coordinate system W are set in the same manner as in the case of the prior art.

According to this embodiment, posture alignment is carried out in such a manner that one axis selected for the work coordinate system W and one axis selected for the tool coordinate system T intersect with each other by a set angle. To this end, one axis of the axes X, Y and Z of the tool coordinate system T and one axis of the axes X, Y and Z of the work coordinate system are selectively set in order to carry out posture alignment and an angle of intersection between the selectively set axes is set.

In the example shown in FIGS. 4(a)–4(g), the Z axis is selected for both the tool coordinate system T and the work coordinate system W and an angle of intersection of θ is set. If the angle of intersection set is 0, this means that the selected axes face in the same direction. The operating speed for manual feeding is also set beforehand in order to perform posture alignment.

The operator, after operating the mode key 17, operates the robot so that the 21 moves to the position where it is to be taught with respect to the workpiece 21. Then the operator depresses the sift key 15 and the posture alignment key 19 for carrying out posture alignment, so that the processor 101 starts the process of FIG. 3.

A unit vector t (refer to FIG. 4(b)) passing through the origin of the tool coordinate system T in parallel with the axis (axis Z in the case of FIGS. 4(a) to 4(g)) selectively set for the tool coordinate system T is obtained (step a1).

Next, a unit vector w (refer to FIG. 4(c)) passing through the origin of the tool coordinate system T in parallel with the axis (axis Z in the case of FIGS. 4(a) to 4(g)) selectively set for the work coordinate system W (step a2) is obtained.

A normal vector n passing through the origin of the tool coordinate system T and being orthogonal to the vectors t and w is then obtained from the vector product of the unit vector t and the unit vector w (refer to FIG. 4(d)) (step a3).

n=t×w (where × is the operator of the vector product)

It is then determined as to whether or not the normal vector n obtained is "0" (step a4). If the normal vector n is "0", step a8 is proceeded to.

On the other hand, if the normal vector n is "0", this means that the unit vectors t and w are parallel so that a definite normal vector cannot be obtained from these vectors. An alarm is then generated at the display etc. of the teaching pendant 104 and a message is displayed (step a5) inviting the input of a vector n' passing through the origin of the tool coordinate system T in a plane formed by two axes different from those set for the tool coordinate system. In the example shown in FIGS. 4(a) to 4(g), the axis Z of the tool coordinate system T is set as the selected axis and in this case inputting of a vector n' passing through the origin of the tool coordinate system in the XY plane of the tool coordinate system T is invited, but, in practice, for obtaining such a vector n', it is sufficient that the X axis or the Y axis be designated. In the example in FIG. 4(e) the X axis is designated.

When the vector n' is inputted (step a6), the vector n' is taken as the normal vector (step a7) and step a8 is proceeded to. In step a8, the angle of intersection α of the vectors t and w is derived (refer to FIG. 4(e)).

A transformation matrix F is then obtained by rotating the normal vector n by a difference ($\alpha - \theta$) of the obtained angle of intersection α and the target set angle of intersection θ (step a9). When the set target angle of intersection is "0", the difference is $\alpha - \theta = \alpha - 0 = \alpha$ and a transformation matrix F where the vector t coincides with the vector w (in the example of FIGS. 4(a) to 4(g), the axis z of the tool coordinate system T and the axis Z of the work coordinate system W are parallel) is obtained.

A coordinate system R for a flanged surface of the wrist at the end of an arm of the robot in a current robot posture and position, viewed from the robot reference coordinate system, is then obtained. And also a coordinate system H for the end of the tool, viewed from the robot reference coordinate system, is obtained from the coordinate system R and the tool coordinate system T (step a10).

H=R·T

The above transformation matrix is then applied to the above obtained coordinate system H and a coordinate system H' for a target posture and position for the tool posture alignment is obtained (step a11) (refer to FIG. 4(f).

H'=H·F

The robot is then driven in such a manner as to operate at the set operating speed towards the target posture position H' (step a12). In FIG. 4(g), tool posture H before posture alignment is shown by dotted lines and tool posture H' after posture alignment (when the set target angle θ=0) is shown by solid lines.

The robot is then driven automatically in such a manner that the axis selected for the tool coordinate system T satisfies a prescribed relationship (set angle of intersection θ) with respect to the axis selected for the work coordinate system W and the posture of the tool 20 then satisfies the desired relationship with respect to the workpiece 21.

[Second Embodiment]

In the first embodiment, a robot is automatically driven and the posture of the tool 20 is changed so that the axis selected for the tool coordinate system T and the axis selected for the work coordinate system W satisfy a predetermined relationship (that is, intersect with each other by a set angle). In contrast with this, in the second embodiment, the tool posture is changed by automatically driving a robot in such a matter that the tool coordinate system T satisfies a set relative relationship with respect to the work coordinate system W.

First, the tool coordinate system T and the work coordinate system W are set in the same manner as in the case of the first embodiment. The operation speed for manual feeding during posture alignment is also set. The relative relationship it is wished to establish between the work coordinate system W and the tool coordinate system T is also set.

Rotation angles for rotation about the axes X, Y and Z of the work coordinate system are set when it is wished to make a rotated work coordinate system the target posture for the tool coordinate system T. The process of FIG. 5 is then executed by the main processor 101 by continuous simultaneous pressing of the shift key 15 and the posture alignment key 19 of the teaching pendant 104 and the tool posture is automatically changed to the target posture.

FIGS. 6(a) to 6(c) are views illustrating the operation of this second embodiment, with FIG. 6(a) showing the relationship between the workpiece (work coordinate system) before carrying out posture alignment and the tool (tool coordinate system).

When the shift key 15 and the posture alignment key 19 are pressed at the same time, a transformation matrix F for rotating the work coordinate system W by just the set rotation angles is obtained based on the rotation angles about the axes of rotation X, Y and Z set for the work coordinate system W (step b1). The transformation matrix F is then applied to with the work coordinate system W to obtain a work coordinate system G after the transformation is obtained (step b2) (refer to FIG. 6(b)).

G=W·F

Next, a coordinate system R for a flanged surface of the wrist at the end of an arm of the robot in a current robot posture and position, viewed from the robot reference coordinate system, is obtained and a coordinate system H for the end of the tool viewed from the robot reference coordinate system is obtained from the coordinate system R and the tool coordinate system T (step b3).

H=R·T

The coordinate systems G and H thus obtained are then resolved into posture components Gr and Hr, and position components Gl and Hl, the posture component Hr of the coordinate system H is substituted with the posture component Gr of the coordinate system G, and a new coordinate system H' for the coordinate system for the end of the tool is obtained (step b4) (refer to FIG. 6(c)).

Namely, the coordinate system G and the coordinate system H are expressed by the following equations 1 and 2.

$$G = Gr \cdot Gl = \begin{bmatrix} Nxg & Oxg & Axg & Pxg \\ Nyg & Oyg & Ayg & Pyg \\ Nzg & Ozg & Azg & Pzg \\ 0 & 0 & 0 & 1 \end{bmatrix} \quad (1)$$

$$H = Hr \cdot Hl = \begin{bmatrix} Nxh & Oxh & Axh & Pxh \\ Nyh & Oyh & Ayh & Pyh \\ Nzh & Oyz & Azh & Pzh \\ 0 & 0 & 0 & 1 \end{bmatrix} \quad (2)$$

The new coordinate system H' obtained by replacing the posture component Hr of the coordinate system H with the posture component Gr of the coordinate system G is expressed by the following equation 3.

$$H' = Gr \cdot Hl = \begin{bmatrix} Nxg & Oxg & Axg & Pxh \\ Nyg & Oyg & Ayg & Pyh \\ Nzg & Ozg & Azg & Pzh \\ 0 & 0 & 0 & 1 \end{bmatrix} \quad (3)$$

The robot is driven at the set operating speed in the direction of the new coordinate system H' obtained from equation 3 and the tool posture is changed in such a manner that the tool coordinate system satisfies the relative relationship set with respect to the work coordinate system and the posture alignment operation is completed (step b5).

[Third Embodiment]

In the third embodiment, the invention is applied to the case where a servo gun capable of sensing the position of movable parts of tools and driven by a servo motor is utilized as the tool 20. In this embodiment the movable parts of the tool 20 are put under servo control as an additional axis of the robot controller and control of the movable parts is also carried out by the robot controller. A key can also be provided on the teaching pendant 104 as manual operating means for manually feeding the moving parts of the tool, but in the example shown in FIG. 2 such a key is not provided.

When it is more convenient to rotate and move the tool on the basis of a tool center point (hereinafter referred to as "TCP") the tool coordinate system T is set for the tool 20, and when a part where TCP is set moves, the tool coordinate system T is automatically set in accordance with the movement of the TCP.

A process executed by the main processor 101 of the robot controller is explained using a flowchart of FIG. 7 and FIGS. 8(*a*) to 8(*c*') and FIGS. 9(*a*) to 9(*c*') illustrating operations of the tool.

First, a tool coordinate system T taken as a reference is set at a part of the tool 20. FIG. 8(*a*) shows a case where the tool coordinate system T is set at a movable part 20*a* of the tool 20 (specifically, set at the tip of a movable side of a spot welding gun) and FIG. 8(*a*') shows a case where the tool coordinate system T is set at a fixed part 20*b* of the tool 20.

FIGS. 8(*a*) to 8(*c*) and FIGS. 9(*a*) to 9(*c*) show the case where the tool coordinate system T is set at the movable part 20*a* of the tool 20, while FIGS. 8(*a*') to 8(*c*') and FIGS. 9(*a*') to 9(*c*') show the case where the tool coordinate system T is set at a fixed part 20*b* of the tool 20.

Next, a reference position 0 of the movable part is set on the tool coordinate system set in the above manner. In FIG. 8(*b*) and FIG. 8(*b*'), this reference position 0 is set to a place where it is apart from the position B of a fixed part on the side on which the tip of the movable part is provided, by a distance "0" in the direction of movable part.

The direction of shifting of the movable part 20*a* of the tool 20 is set on the basis of the axis X, Y or Z of the tool coordinate system T. In the examples in FIG. 8(*c*) and FIG. 8(*c*'), the Z axis of the tool coordinate system Z is set.

Further, the movable part (tip on movable side) 20*a* of the tool 20 is moved to the desired position P by manual feeding or by execution of a program (refer to FIG. 9(*a*) and FIG. 9(*a*')) after setting of the operating speed in manual feeding.

When the shift key 15 and the operating direction key 12 are then pressed and a manual feeding is instructed based on the tool coordinate system T, the main processor 101 of the robot controller starts the processing of FIG. 7.

First, a distance L(L=P−O) from the reference position 0 set for the tool moving part 20*a* to the current position P of the tool moving part 20*a* is obtained (step c1) (refer to FIG. 9(*b*) and FIG. 9(*b*')) and the transformation matrix F is obtained (step c2) as a translation matrix for the obtained distance L in the direction of the axis (in this example, the direction of the Z axis) set for the direction of movement.

A new tool coordinate system T' is obtained from the set tool coordinate system T as the reference coordinate system and the above-mentioned transformation matrix F from the following equation (step c3) (refer to FIG. 9(*c*) and FIG. 9(*c*')).

T'=T·F

And a manual feeding in the direction of the axis instructed based on the newly obtained tool coordinate system T' is then executed (step c4).

According to this embodiment, as shown in FIG. 9(*b*) and FIG. 9(*b*'), and FIG. 9(*c*) and FIG. 9(*c*'), even if the moving part 20*a* of the tool 20 moves, the tool coordinate system T after the movement can be obtained automatically and the movement takes place in the instructed direction of operation based on the obtained tool coordinate system T', so that the tool 20 and the workpiece 21 are therefore prevented from interfering with each other during the movement.

[Fourth Embodiment]

In the fourth embodiment, operation of the robot is automatically suspended when certain suspension conditions that are set up are fulfilled when the robot is being moved by manual operation. The conditions for suspension therefore have to be set in advance in this embodiment. The suspension conditions are deemed fulfilled in the following cases, for example;

(1) A sensor for sensing the fact that the tool comes into contact with the workpiece is provided and an output signal from the sensor is detected via the input/output interface 106.

(2) The load torque of servo motors driving each axis of the robot is detected, and if a threshold value is exceeded by the load torque of any one of the servo motors, it is deemed that the tool 20 has come into contact with the workpiece 21.

In practice, the load torque is detected based on the feedback values of the drive currents for the servo motors for each axis or based on the torque command values (current instruction values), and it is deemed that the suspension conditions is fulfilled when the detected load torque (or detected current) or the torque command value are equal to or greater than set threshold values.

Further, when an observer for estimating load torque is provided, the suspension conditions can be arranged in such a manner that operation is suspended when the load torque estimated by the observer is equal to or in excess of the threshold value.

(3) A manual operation is automatically suspended when the distance moved from the manual operation start point exceeds a set value.

There are various kinds of suspension conditions and optimum suspension condition is selected in accordance with an application. For example, if the suspension conditions (1) to (3) are applicable to the robot controller, which of these conditions should be selected as the suspension condition can be set beforehand. It is necessary to set a distance to be moved from the start point for automatic suspension as a set value in the case where the suspension condition (3) is selected.

After the operating speed during manual operation is set and the conditions for suspension are fulfilled, whether or not to operate by a designated amount in a designated direction from the suspension position is set. When this is set, the coordinate system (robot reference coordinate system, work coordinate system, tool coordinate system etc.) taken as a reference for the operating direction is selectively set, one of the axes X, Y or Z of this selected coordinate system is set as the operating direction and the distance to be moved is also set.

After setting of the suspension conditions, the operating speed, as to whether or not to retreat after fulfillment of the suspension conditions, and as to in which direction and by how much amount of movement to retreat in case of retreating, the shift key 15 and the operation direction keys 12 and 13 are pushed so as to instruct a manual feeding, the main processor 101 of the robot controller starts the process of FIG. 10.

The main processor 101 outputs move instruction to move the robot in an operating direction instructed by the operation direction keys 12 and 13 at the set operating speed so that the robot is made to move at the set operating speed (step d1). Whether or not the suspension conditions are fulfilled is then determined (step d2). If not fulfilled, whether or not depression of the operation direction keys have been released is determined (step d8). If not released, then process return to step dl and the process of step dl, step d2 and step d8 is repeated.

If the depression of the shift key 15 or the operation direction keys 12 and 13 are released before fulfillment of the suspension condition is sensed, operation of the robot is suspended (step d7).

When the condition for suspension is fulfilled, for example, if the suspension condition (1) above has been set, the main processor 101 detects whether or not a contact detection signal from the sensor is inputted to the input/output interface 106 with every predetermined period. When the main processor 101 detects input of a contact detection signal, the position at this time is stored and the manual feeding for the robot is automatically suspended (regardless of whether or not the shift key 15 and the operation direction keys 12 and 13 are pushed) (step d2, step d3).

In the case where the condition (2) above is set, the main processor 101 determines, with every predetermined period, whether or not the load torque (current feedback value, torque instruction value, or torque value estimated by an observer) on the motors for each axis of the robot is equal to or greater than a threshold value (step d2). The position at the time when the load torque of a motor for any one of the axes is greater than or equal to the threshold value is then stored and operation of the robot is suspended (step d3).

In the case where the suspension condition (3) above is set, the main processor 101 adds the movement amount of the robot to a register after the start of manual operation at step dl with every predetermined period and determines whether the suspension condition is fulfilled or not by determining whether or not this added value has become the set value. When this added value is equal to or greater than the set value, it is assumed that the suspension condition is fulfilled (step d2), so that position of the robot at this time is then stored and movement of the robot is suspended (step d3).

When an instruction to suspend movement of the robot is outputted by the robot controller, the robot overshoots because of its own momentum. The robot is therefore returned to the position where the stored suspension condition is fulfilled (step d4). A determination is then made as to whether or not a retreat of the robot has been set (step d5). If a retreat has been set, movement is carried out in the set direction by the set amount (step d6) and movement of the robot is suspended (step d7). If a retreat has not been set, on the other hand, the robot is left stopped at the position where the robot was stopped according to the suspension condition.

The above, explanations is concerned with embodiments for a manual feeding assisting in a teaching operation of the present invention. However, any one of the first to fourth embodiments stated above can be provided in a robot controller and executed or all of the first to fourth embodiments can be provided and then called up for execution using a soft key etc.

In the following embodiment, the first embodiment, second embodiment, third embodiment and fourth embodiment are stored in a robot controller as a "posture alignment mode using single axis", a "posture alignment mode using a coordinate system", a "mode for setting a coordinate system on a moving part of a tool" and a "suspension mode dependent on suspension conditions", respectively. A mode is then selected using the soft key 11 and processing for the selected mode is executed.

The work coordinate system and the tool coordinate system (the reference tool coordinate system referred to the "mode for setting a coordinate system on a moving part of a tool" of the third embodiment) are the same for any embodiment (any mode). The function selection key 18 is therefore operated so as to select the coordinate system, and the work coordinate system and tool coordinate system are collectively set with respect to the four modes for assisting the teaching operation.

Further, the value set for the speed of the manual operation in this teaching assistance operation can also be set beforehand in such a manner as to be common for all modes. Alternatively, when the operating speed is set manually at every mode, the soft key 11 can be operated to invoke individual modes for setting, thereby setting the operation speed for each mode.

In the "mode for setting a coordinate system on a moving part of a tool" of the third embodiment, the reference value O has to be set, but such a set value peculiar to each mode can be set after invoking of the individual mode for setting.

[Application to a Servo Gun]

The following is a description of an embodiment where the present invention is applied to a servo gun for driving a movable side tip using a servo motor so as to carry out spot welding.

In this embodiment, the posture of a servo gun 20 is taught so that the opening and closing direction of the gun is perpendicular to the surface of workpiece 21 which includes a contact point. Further, the position of contact between a fixed side tip 20*b* and the workpiece 21 is taught. In a typical vehicle spot welding, there are many cases where the view of the lower part of a panel is obstructed by the vehicle body, and a description is given of teaching operation carried out under such condition by the robot controller according to the present invention.

First, as shown in FIG. 11(*a*), the robot is manually fed and the servo gun 20 is moved in such a manner as to come close to a collision point with the workpiece 21.

Next, the posture of the servo gun has to be changed in such a manner that the opening and closing direction of the servo gun is perpendicular to surface of the workpiece which includes a collision point. There are three methods with which to achieve this. One is to use the "mode for setting a coordinate system on a moving part of a tool" of the third embodiment, other is to use the "posture alignment mode using single axis" of the first embodiment, and still other is to use the "posture alignment mode using a coordinate system" of the second embodiment.

In the case of using the "mode for setting a coordinate system on a moving part of a tool" of the third embodiment, this mode is selected by the soft key etc. of the teaching pendant 104, and, the movable side tip of the servo gun is moved so that the TCP comes as close as possible to the workpiece 21, then, the rotation operation key 13 is selected in such a manner that the opening and closing direction of the gun is perpendicular to the surface of the workpiece 21 which includes a collision point. When the shift key 15 and the select rotation operation key 13 are pressed, the main processor 101 of the robot controller executes the process shown in FIG. 7 to cause the robot to operate (refer to FIG. 11(*b*)) taking the TCP set at the end of the movable tip 20*a* as a reference.

As a result, the posture of the servo gun 20 can be manually moved in such a manner that the opening and closing direction of the servo gun 20 becomes perpendicular to the surface of the workpiece 21 which include a collision point without the servo gun 20 and the workpiece 21 interfering with each other.

On the other hand, in case of using the "posture alignment mode using single axis" of the first embodiment, this mode is selected by the soft key 11. And the angle of intersection θ of the axes of the tool coordinate system T and the work coordinate system W for posture alignment is set. In the example of FIG. 11(*c*), the Z axes are set from the tool coordinate system T and the work coordinate system W as the axes for posture alignment and the angle of intersection θ is set to "0" (i.e. the Z axes of both the coordinate systems are made parallel with respect to each other).

When the shift key 15 and the posture alignment key 19 are pressed, the main processor 101 of the robot controller starts the process shown in FIG. 3, the robot is driven in such a manner as to make the angle of intersection between the axes Z that are the axes selected for the tool coordinate system T and the work coordinate system W become the set angle of intersection θ(=0), and position is decided in such a manner that the opening and closing direction of the servo gun 20 becomes perpendicular to the surface of the workpiece 21 which includes a collision point (refer to FIG. 11(*c*)).

In case where the "posture alignment mode using a coordinate system" of the second embodiment is selected, the angle of rotation about each axes of the work coordinate system W defining the relative relationship between the tool coordinate system T and the work coordinate system W is set. When the shift key 15 and posture alignment key 19 are pressed, the processor 101 executes the process shown in FIG. 5 to carry out position such that the opening and closing direction of the servo gun 20 becomes perpendicular to the surface of the workpiece 21 which includes a collision point, as shown in FIG. 11(*c*).

In the example in FIG. 11(*c*), the tool coordinate system T is aligned to the work coordinate system W. with the result that all the rotation angles about of each axis to be set become "0" and the transformation matrix F obtained in step b1 of FIG. 5 becomes a unit matrix.

After positioning is carried out so that the opening and closing direction of the servo gun 20 becomes perpendicular to the surface of the workpiece 21 which includes a collision point, the mode is switched to the "suspension mode dependent on suspension conditions" of the fourth embodiment. Then, the suspension conditions for monitoring are selectively set and retreat is not selected. When the shift key 15 is pressed together with the operation key 12 which causes the fixed side tip to come into contact with the workpiece 21, the main processor 101 of the robot controller executes the process of FIG. 10 and suspension takes place automatically at the position where the workpiece 21 and the fixed side tip 20*b* of the tool 20 come into contact (i.e. a position where movement is done in the set direction and by the set amount of movement).

[Application to an Air Gun]

In the case where the spot welding gun is an air gun opening and closing using air pressure rather than a servo gun driven by a servo motor, it is necessary to make the opening and closing direction of the air gun 20 perpendicular to the surface of the workpiece 21 which includes a collision point and it is necessary to have a gap of a designated distance between the fixed side tip 20*a* and the workpiece 21.

When an air gun 20 is used, as with the aforementioned servo gun, the gun is kept open and manually fed to an appropriate position near the collision point in the workpiece 21. The "posture alignment mode using a coordinate system" of the second embodiment is selected, the direction of opening and closing of the gun is made perpendicular to the surface including a collision point and the "suspension mode dependent on suspension conditions" of the fourth embodiment is selected as with the servo gun. However, in this case, as it is necessary to make a prescribed distance of separation after the servo gun 20 and the workpiece 21 come into contact, "retreat" is selected and the withdrawal direction and extent of evacuation is set.

In the example in FIG. 12, the direction of retreat is taken to be the Z axis direction of the work coordinate system (or the tool coordinate system) and the target amount of retreat is set. Then, the tool 20 is separated by the set distance and the robot is suspended after the workpiece 21 and the tool 20 come into contact, by the processing at step d5 and step d6 of FIG. 10.

[Application to a Servo Hand]

Figure 13:
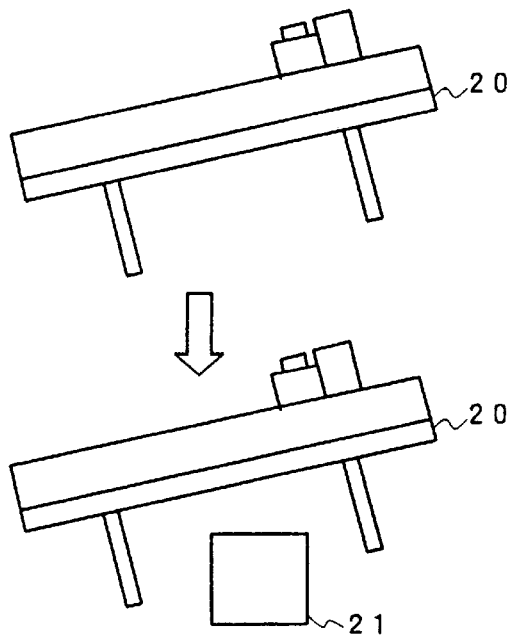
Figure 13:
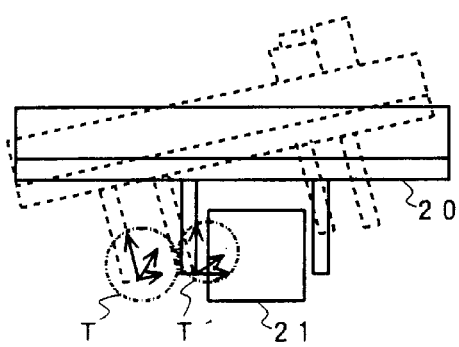
Figure 13:
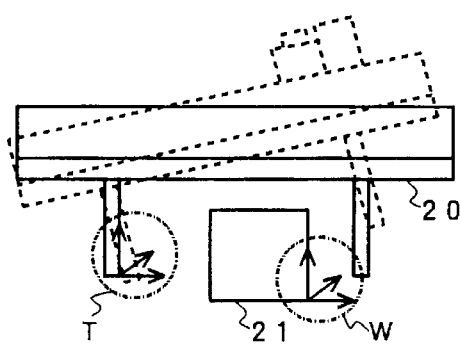

FIGS. 13(*a*) to 13(*c*) are views describing an example of the present invention applied to teaching of a grasping position posture to a hand 20 driven by a servo motor.

First, the hand 20 is manually operated so as to come near to the workpiece 21 with the hand 20 in an open state (refer to FIG. 13(*a*)). Then, the hand has to be rotated in such a manner that the grasping surfaces of the hand is parallel to the sides of the workpiece. To attain this, the "posture alignment mode using single axis" of the first embodiment, the "posture alignment mode using a coordinate system" of the second embodiment and the "mode for setting a coordinate system on a moving part of a tool" of the third embodiment are utilized.

FIG. 13(*b*) is a view illustrating the case where the "mode for setting a coordinate system on a moving part of a tool" of the third embodiment is utilized. First, the TCP set at the moving part of the hand is moved by a manual feeding so as to be moved as close as possible to the workpiece 21. Then the mode is switched to the "mode for setting a coordinate system on a moving part of a tool", and a rotation direction is selected. When the rotation operation direction key 13 for this direction and shift key 15 are pressed, the processor 101 for the robot controller carries out the process shown in FIG. 7 so that the rotation about the TCP is performed by manual operation, with the result that the teaching side surface of the hand 20 becomes parallel to the side surface of the workpiece 21 (refer to FIG. 13(b)).

FIG. 13(c) is a view illustrating the case of using the "posture alignment mode using single axis" of the first embodiment or the "posture alignment mode using a coordinate system" of the second embodiment.

In case of using the "posture alignment mode using single axis", an axis (axis Z in FIG. 13(c)) parallel to the grasping surface of the hand 20 in the tool coordinate system T and an axis (axis Z in FIG. 13(c)) parallel to e side surface of the workpiece 21 in the work coordinate system W are selected and the angle of intersection is set to "0", for example. When the shift key 15 and posture alignment key 19 are pressed, the main processor 101 carries out the process of FIG. 3 so as to operate the robot in such a manner that the teaching side surface of the hand 20 and the side surface of the workpiece 21 become parallel.

In case of using the "posture alignment mode using a coordinate system" is used, in the example in FIG. 13(c), the angle of rotation about each of the axes X, Y and Z of the work coordinate system W is all set to "0". When the shift key 15 and posture alignment key 19 are pressed, the main processor 101 carries out the process of FIG. 5 and the robot is operated in such a manner that the teaching side surface of the hand 20 becomes parallel to the side surface of the workpiece 21.

In the present invention, as the tool posture can be automatically moved to the desired posture by a manual operation during teaching, teaching can be carried out without difficulty and with accuracy even for positions where the relationship between the tool and the workplace cannot be seen. The tool coordinate system, which hat been set at a moving part of a tool, can also be automatically reset in line with movement of the moving parts. Therefore, interference between the tool and the workpiece can be avoided even when rotating the tool posture about the tool center point (TCP).

Further, when suspension conditions are set and these suspension conditions are then fulfilled, accurate teaching is possible after automatically interrupting a manual operation.

What is claimed is:

1. A robot controller comprising:

storage means for storing a tool coordinate system set to the position and posture of a tool attached to a robot, a work coordinate system set to the environment where a workpiece is placed, any one coordinate axis selected from the three coordinate axes of the tool coordinate system and any one coordinate axis selected from the three coordinate axes of the work coordinate system used in carrying out posture alignment, and an angle of intersection formed between said two selected coordinate axes;

means for obtaining a target posture of the robot in a such manner that the angle formed between the two selected coordinate axes becomes equal to the stored angle when a posture alignment instruction is inputted; and means for automatically moving the robot to the target posture.

2. A robot controller comprising:

storage means for storing a tool coordinate system set to the position and posture of a tool attached to a robot, a work coordinate system set to the environment where a workpiece is placed, and data specifying a posture relationship of the tool coordinate system and the work coordinate system used in carrying out posture alignment;

means for obtaining a target posture of the robot in such a manner that the tool coordinate system and the work coordinate system take on the posture relationship indicated by the specified data stored in the storage means when a posture alignment instruction is inputted; and means for automatically moving the robot to the target posture.

3. The robot controller according to claim 2, wherein the data specifying the posture relationship of the tool coordinate system and the work coordinate system are rotation angles about each coordinate axis which would be necessary to make a posture of a virtual coordinate system obtained by rotating the work coordinate system about each coordinate axis of the work coordinate system itself in a virtual manner and in a prescribed order coincide with a posture of the tool coordinate system when the robot is moved to the target posture for posture alignment.

4. A robot controller, with a tool having moving parts attached to a robot and with a tool coordinate system set to a reference position and posture on the moving parts, said robot controller comprising:

means for transforming the tool coordinate system based on an amount of movement of the moving parts of the tool from the reference position and posture, wherein the tool coordinate system is made to move in line with movement of the moving parts of the tool from the reference position and posture.

5. A robot controller comprising:

monitoring means for monitoring whether or not a manual operation suspension condition set in advance in the robot controller is fulfilled, said manual operation suspension condition being fulfilled when a sense signal from a sensor for sensing contact of a tool attached to a robot and a workpiece is output, when a load torque on one or more motor of motors driving each axis of the robot exceeds a set torque, or when a predetermined distance is moved from a manual operation start position, wherein the manual operation is automatically interrupted when fulfillment of the suspension conditions is detected from the monitoring means during a manual feeding.

6. The robot controller according to claim 5, wherein the feed direction by said manual feeding can be selected to any one of X, Y and Z axes of the robot reference coordinate system, the work coordinate system or the tool coordinate system.

7. The robot controller according to claim 5, further comprising means for storing a robot position when said suspension condition is fulfilled, wherein the robot, which has moved a distance due to its inertia from the fulfillment of the suspension condition to actual stop, is returned to the position stored in the storage means.

8. The robot controller according to claim 7, further comprising means for setting and storing for a direction and a distance of retreat from a position where the suspension condition is fulfilled, wherein the robot moves a set distance in a direction stored in the storage means after suspension at a position where the suspension condition is fulfilled.

* * * * *